(12) United States Patent
Kihara et al.

(10) Patent No.: US 8,140,776 B2
(45) Date of Patent: Mar. 20, 2012

(54) COMPUTER SYSTEM COMPRISING STORAGE OPERATION PERMISSION MANAGEMENT

(75) Inventors: Kenichi Kihara, Yokohama (JP);
Masayasu Asano, Yokohama (JP);
Nobuhiro Maki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 438 days.

(21) Appl. No.: 12/497,141

(22) Filed: Jul. 2, 2009

(65) Prior Publication Data

US 2010/0268903 A1    Oct. 21, 2010

(30) Foreign Application Priority Data

Apr. 21, 2009  (JP) ................................. 2009-102555

(51) Int. Cl.
*G06F 12/00* (2006.01)

(52) U.S. Cl. ........................ 711/154; 711/156; 711/163

(58) Field of Classification Search .................. 711/100, 711/114, 154, 156, 163
See application file for complete search history.

(56) References Cited

U.S. PATENT DOCUMENTS

| 2006/0027644 A1* | 2/2006 | Takashi et al. ................ 235/380 |
| 2006/0053299 A1 | 3/2006 | Tomita |
| 2006/0282636 A1 | 12/2006 | Yamamoto et al. |

FOREIGN PATENT DOCUMENTS

| JP | 2006-079194 | 3/2006 |
| JP | 2006-343907 | 12/2006 |

* cited by examiner

*Primary Examiner* — John Lane
(74) *Attorney, Agent, or Firm* — Foley & Lardner LLP

(57) ABSTRACT

The system of the present invention enhances the security of settings and operations in a storage device, and copes with numerous changes of the operational status of work executed within a computer system. When it becomes necessary to issue an operating command to the storage, storage operation propriety is determined on the basis of the operational status of the work and definition of operation permission for each work operation state.

13 Claims, 14 Drawing Sheets

FIG. 4

| PERMISSION PATTERN ID | WORK STATUS | ROLE | INITIAL COPY | SPLIT PAIR | RESYNCHRONIZE (FAILURE) | RESYNCHRONIZE (NORMAL) | DELETE PAIR | INVERT PAIR |
|---|---|---|---|---|---|---|---|---|
| REMOTE_MIRROR1 | NORMAL OPERATION | STORAGE | NO | NO | YES | NO | NO | NO |
| REMOTE_MIRROR1 | NORMAL OPERATION | WORK | YES | YES | YES | YES | YES | YES |
| REMOTE_MIRROR1 | BATCH | STORAGE | NO | NO | NO | NO | NO | NO |
| REMOTE_MIRROR1 | BATCH | WORK | YES | YES | YES | YES | NO | NO |
| REMOTE_MIRROR1 | BACKUP | STORAGE | NO | NO | YES | NO | NO | NO |
| REMOTE_MIRROR1 | BACKUP | WORK | YES | YES | NO | NO | NO | NO |
| REMOTE_MIRROR1 | FAILURE-SUSPEND | STORAGE | NO | NO | YES | NO | NO | NO |
| REMOTE_MIRROR1 | FAILURE-SUSPEND | WORK | YES | YES | YES | YES | YES | NO |
| REMOTE_MIRROR1 | NORMAL-SUSPEND | STORAGE | YES | YES | YES | YES | YES | YES |
| REMOTE_MIRROR1 | NORMAL-SUSPEND | WORK | YES | YES | YES | NO | NO | NO |
| REMOTE_MIRROR1 | TEST | STORAGE | NO | NO | YES | YES | YES | YES |
| REMOTE_MIRROR1 | TEST | WORK | YES | YES | YES | YES | YES | YES |
| REMOTE_MIRROR1 | UNUSED | STORAGE | YES | YES | YES | YES | YES | NO |
| REMOTE_MIRROR1 | UNUSED | WORK | NO | NO | NO | NO | NO | NO |

FIG. 5

| USER NAME | RESOURCE TYPE | RESOURCE ID |
|---|---|---|
| USER_ST01 | STORAGE | ST1 |
| USER_ST01 | STORAGE | ST2 |
| USER_PR01 | WORK | PROG1 |

FIG. 6

| WORK ID | AGENT ID |
|---|---|
| PROG1 | AG1 |
| PROG2 | AG1 |

FIG. 7

| WORK ID | VOLUME |
|---|---|
| PROG1 | ST1/VOL11 |
| PROG2 | ST1/VOL12 |

| WORK ID | AGENT ID | WORK STATUS |
|---|---|---|
| PROG1 | AG1 | BACKUP |
| PROG2 | AG1 | FAILURE-SUSPEND |

| STORAGE ID | VOLUME | PERMISSION PATTERN ID | WORK ID |
|---|---|---|---|
| ST1 | VOL11 | DATABASE_TYPE1 | PROG1 |
| ST1 | VOL12 | DATABASE_TYPE1 | PROG2 |

| PERMISSION PATTERN ID | WORK STATUS | ROLE | VOLUME OPERATION PROPRIETY ||||||
|---|---|---|---|---|---|---|---|---|
| | | | ADD PATH | DELETE PATH | ADD CONFIGURATION | DELETE CONFIGURATION | DISASSEMBLE (DELETE) | CHANGE ATTRIBUTE |
| DATABASE_TYPE1 | NORMAL OPERATION | STORAGE | NO | NO | YES | NO | NO | NO |
| DATABASE_TYPE1 | NORMAL OPERATION | WORK | YES | NO | NO | NO | NO | NO |
| DATABASE_TYPE1 | BACKUP | STORAGE | NO | NO | NO | NO | NO | NO |
| DATABASE_TYPE1 | BACKUP | WORK | YES | NO | YES | NO | NO | NO |
| DATABASE_TYPE1 | FAILURE-SUSPEND | STORAGE | YES | NO | NO | YES | YES | NO |
| DATABASE_TYPE1 | FAILURE-SUSPEND | WORK | YES | YES | NO | YES | YES | YES |

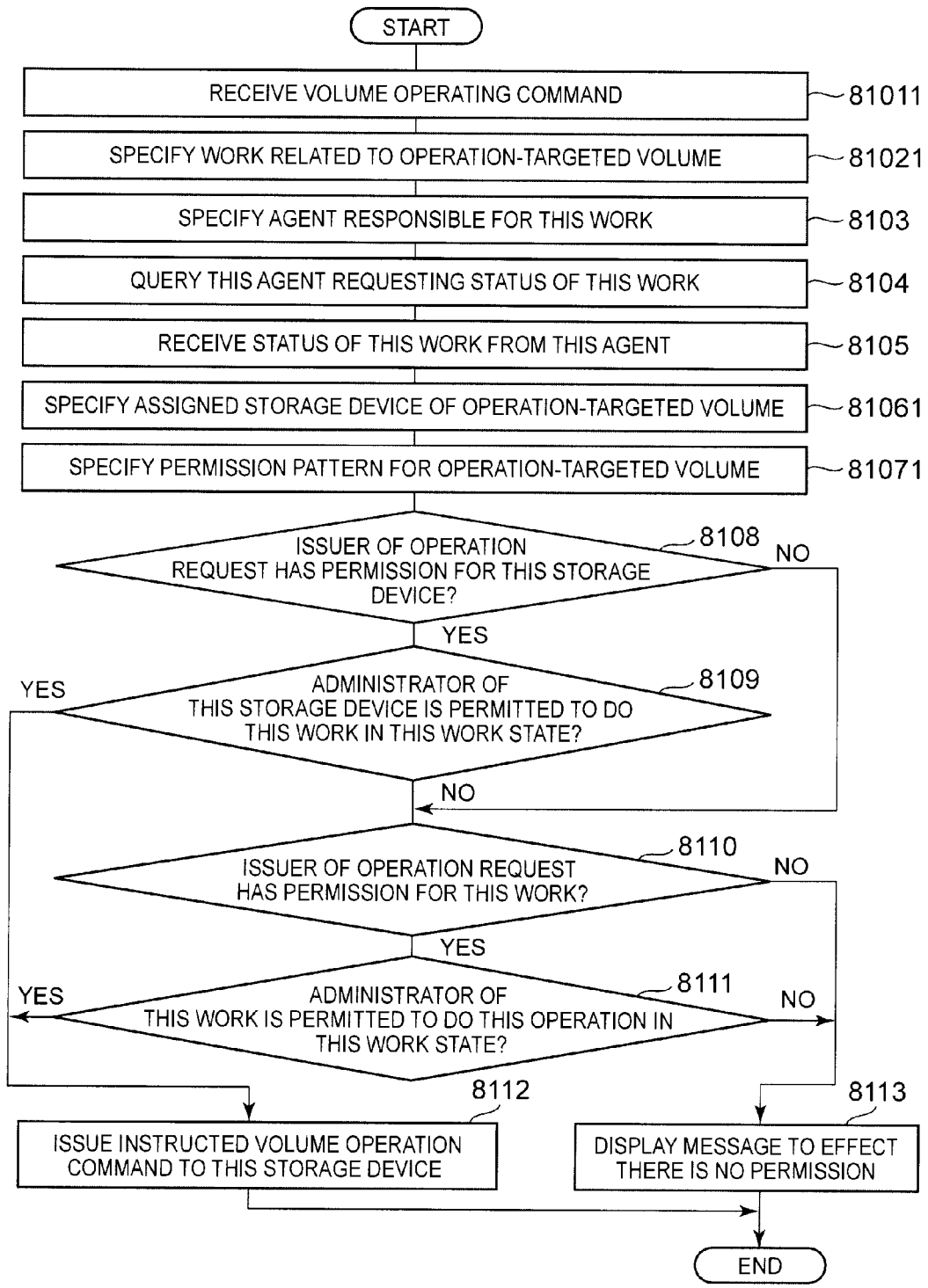

COMPUTER SYSTEM COMPRISING STORAGE OPERATION PERMISSION MANAGEMENT

CROSS-REFERENCE TO RELATED APPLICATIONS

This application relates to and claims priority from Japanese Patent Application No. 2009-102555 filed on Apr. 21, 2009, the entire disclosure of which is incorporated herein by reference.

BACKGROUND OF THE INVENTION

1. Field of the Invention

The present invention relates to operation permission management for a storage device in a computer system configured from a computer and the above-mentioned storage device.

2. Description of the Related Art

A large-scale storage device may also be called a storage subsystem, and in addition to making high-speed, large-capacity storage possible, also has advanced data management functions. A plurality of physical storage components, such as hard disk drives, is mounted inside the storage device, and a logical volume, which is a logical storage area, is configured by appropriately reallocating the storage area inside these storage components. Basically, it is this logical volume unit that the host computer is able to utilize, and data used in processing work is able to be stored in this logical volume. Further, the value-added functions provided by the storage device, for example, a data copy process that does not go through the host computer, are also carried out having this logical volume as the primary unit of operation.

To allocate and operate the logical volume, the storage administrator must make various settings and carry out operations, such as changing the operational status, with respect to the storage device. However, failure to add appropriate restrictions for these settings and operations in accordance with the situation gives rise to problems, such as the inability to access the logical volume from the host and the loss of required data.

To prevent problems like this, the present invention relates to a method for restricting access to the storage device when making settings and carrying out operations. A known technology for this restriction method is disclosed in the patent document (JP-A-2006-79194).

The problem that the present invention is to solve is to provide better setting/operation restricting means for enhancing the security of settings/operations with respect to the storage device. The patent document (JP-A-2006-79194) discloses technology for carrying out access restriction by registering a storage operating schedule inside a management server, which is a computer for managing the storage device, and distributing storage access permission information in accordance with this operating schedule to the storage device and a server, which is a computer that utilizes the storage device.

However, the problem is that since the contents registered in the operating schedule relate to the operation of the storage device, it is only possible to carry out access restriction corresponding to the situation on the storage device side.

Another problem is that it is only possible to apply access restrictions in a form that accords with the previously registered operating schedule. For example, it is not possible to apply appropriate access restrictions in a case where an event, which is impossible to predict in advance, such as a malfunction, occurs. Further, in a case where the contents of an operation change (diverge) in accordance with circumstances, it is not possible to deal with this change even in an event that is able to be predicted in advance.

SUMMARY OF THE INVENTION

In order to solve at least one of the above-mentioned problems, the present invention provides means for determining storage operation permission in accordance with the operational status of the work program on the server that makes use of the storage device.

Further, in order to solve at least one of the above-mentioned problems, the present invention also provides means for maintaining permission information for each operational state of the work program, and for making it possible to deal with all the operational states.

BRIEF DESCRIPTION OF THE DRAWINGS

FIG. 4 is a diagram showing a data structure and examples of data of operation propriety information 213 of the first embodiment and the second embodiment;

FIG. 5 is a diagram showing a data structure and examples of data of administrator role information 214 of the first embodiment and the second embodiment;

FIG. 6 is a diagram showing a data structure and examples of data of work information 215 of the first embodiment;

FIG. 7 is a diagram showing a data structure and examples of data of work configuration information 442 of the first embodiment and the second embodiment;

FIG. 17 is a diagram showing a data structure and examples of data of volume information 216 of the third embodiment;

FIG. 18 is a diagram showing a data structure and examples of data of operation propriety information 217 of the third embodiment; and FIG. 19 is the flow of processing when an operating command 922 is received by the management server program 211 of the third embodiment.

DESCRIPTION OF THE PREFERRED EMBODIMENTS

The first embodiment and the second embodiment are examples related to access control with respect to a copy function management operation of the logical volume provided by the storage device. The third embodiment is an example related to the access control with respect to a management operation relative to this logical volume. The modes for putting the present invention into practice will be explained below in accordance with the drawings.

[Embodiment 1]

Figure 1:
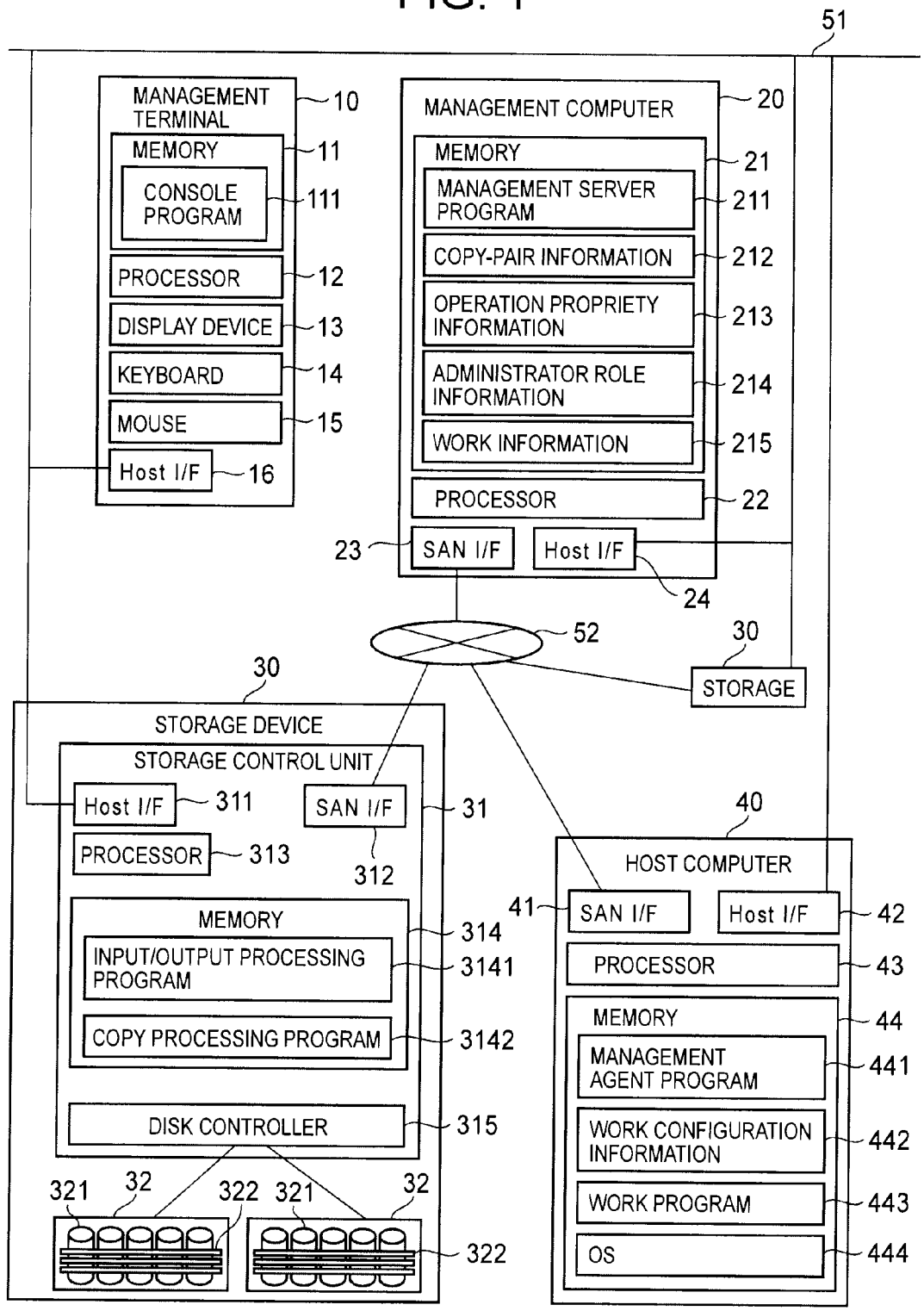
FIG. 1 is a block diagram of the system for a first embodiment and a second embodiment.

FIG. 1 is a block diagram of a computer system related to the first embodiment and the second embodiment. The computer system comprises a management terminal 10; a management computer 20; a storage device 30; a host computer 40; a management network 51; and a storage network 52. The management terminal 10, management computer 20, storage device 30, and host computer 40 are connected via the management network 51. The management computer 20, storage device 30 and host computer 40 are also connected via the storage network 52.

The management network 51 and the storage network 52 are communication lines, and are the paths for sending and receiving data within the information processing system. Furthermore, in FIG. 1 the management network 51 and the storage network 52 are regarded as separate communication lines, but the two may also be a common communication line.

The management terminal 10 is an information processing device, and is configured from a memory 11 for storing data and a program, a processor 12 for executing the program, a display device 13 for displaying data and so forth, a keyboard 14 for accepting text inputted by a user, a mouse 15 for pointing to an arbitrary point on the display screen, and a Host I/F 16 for connecting to the management network 51 and sending/receiving data to/from another information processing device.

A console program 111 is stored in the memory 11 and executed by the processor 12, and accesses the management computer 20 by way of the Host I/F 16 and management network 51, displays information on the display device 13, and receives input from the user of the management terminal 10 via the keyboard 14 and the mouse 15. In the present invention, a storage administrator, who is responsible for storage operation/management, utilizes the management terminal 10 as a window for operating and managing the storage device 30.

The management computer 20 is an information processing device, and comprises a memory 21 for storing data and a program, a processor 22 for executing the program, a SAN I/F 23 for carrying out operating commands and information queries relative to the storage device 30 by way of the storage network 52, and a Host I/F 24 for connecting to the management network 51 and sending/receiving data to/from another information processing device.

A management server program 211 is for managing the storage device 30, and is stored in the memory 21 and executed by the processor 22. Copy-pair information 212 is information related to a data copy process carried out inside the storage device 30. Operation propriety information 213 is information denoting the propriety of executing various operating commands with respect to the storage device 30. Administrator role information 214 is information denoting the roles of users, who either manage or use the storage device 30. Work information 215 is information related to a work program 433 executed on the host computer 40. The copy-pair information 212, the operation propriety information 213, the administrator role information 214 and the work information 215 are stored in the memory 21. The respective information will be explained in detail further below.

The storage device 30 is for storing information, and is configured from a storage control unit 31; and a disk unit 32. The storage control unit 31 comprises a Host I/F 311 for connecting to the management network 51; a SAN I/F 312 for connecting to the storage network 52; a processor 313 for executing an input/output processing program 3141 and a copy processing program 3142; a memory 314 for storing information and programs; and a disk controller 315 for writing/reading information to/from a disk device. The disk unit 32 groups together more than one disk drive 321, and also repartitions the grouped storage areas into a logical storage area. This logical storage area is called a logical volume 322.

The input/output processing program 3141 defines the logical volume in accordance with a request from the management computer 20, and writes/reads data to/from the logical volume in accordance with a request from the host computer 40. The copy processing program 3142 copies data from a specific logical volume 322 to another logical volume 322 in accordance with an instruction from the management computer 20. The host computer 40 is an information processing device, and comprises a SAN I/F 41 for writing/reading data to/from the storage device 30 via the storage network 52, a Host I/F 42 for connecting to the management network 51 and sending/receiving data to/from another information processing device, a processor 43 for executing a program, such as a OS or a work program 443, and a memory 44 for storing data and programs.

A management agent program 441 operates in conjunction with the management server program 211. Work configuration information 442 is information denoting the relationship between a work program 443 and the logical volume 322 that the work program 433 uses. The work program 443 is for processing work executed on the host computer 40. Furthermore, instead of a stand-alone program, the work program 443 may also be configured from a plurality of programs (including service and processing programs). The OS 444 is basic operating software that constitutes the foundation for executing the management agent program 441 and the work program 443.

Figure 2:
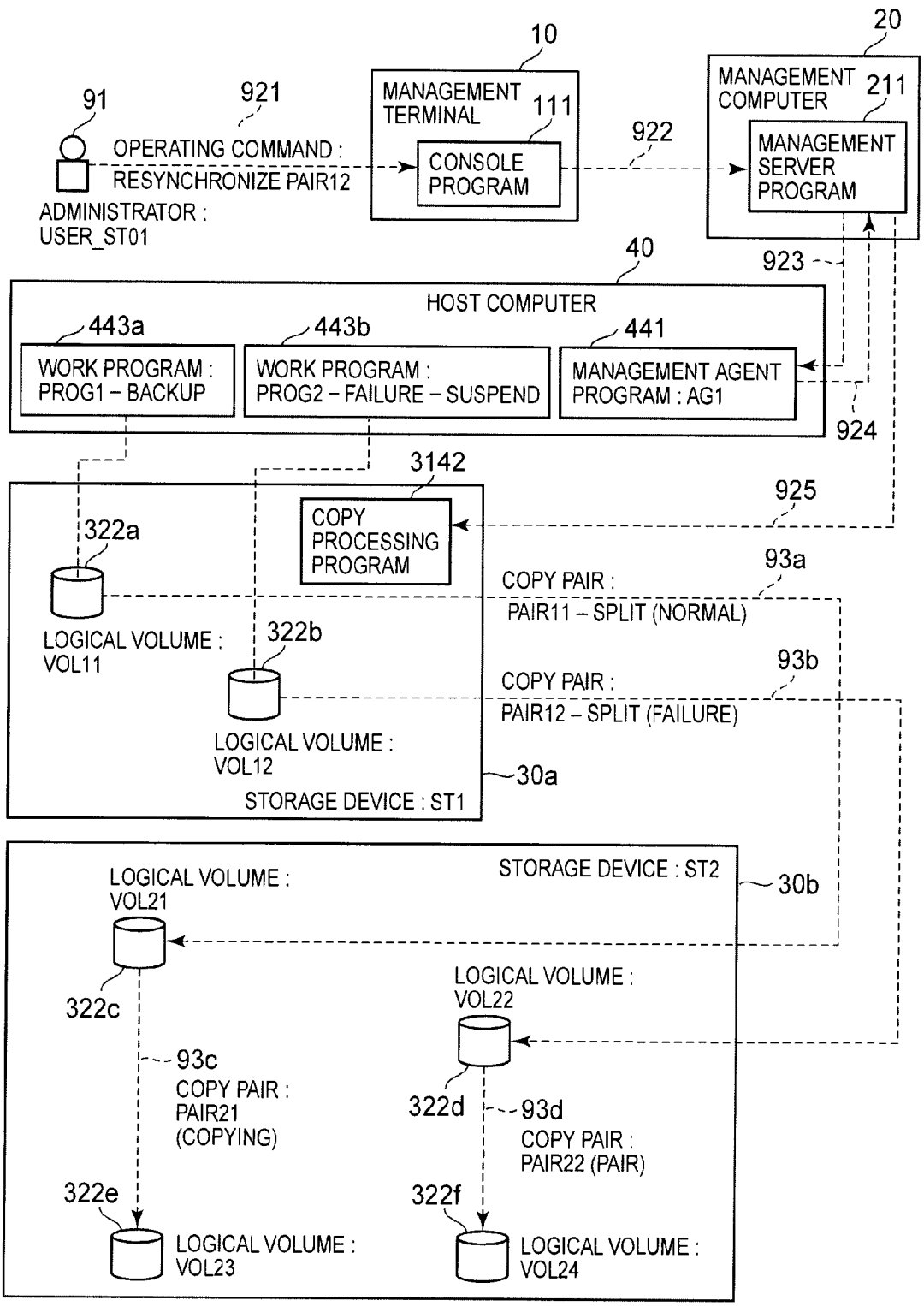
FIG. 2 is a diagram showing the relationship between the components of the system for the first embodiment and the second embodiment, and the status of the components.

FIG. 2 is an example of the configuration and states of a system that uses the technology of the present application. In FIG. 2, storage device 30a and storage device 30b indicate respectively different storage devices 30. There are also other elements that have letters appended at the end of the numbers, and these denote different units of the same element designated by the reference numeral minus the letter.

An administrator 91 issues an operating command 921 to the console program 111. The console program 111 transfers this operating command to the management server program 211 (922). In addition, the management server program 211 queries the management agent program 441 as to the status of the work program 443 (923), and the management agent program 441 responds to this query (924). The management server program 211 determines the operation propriety in accordance with the contents of the request 922 and the response (924), and if operation is permitted, issues an operating command to the copy processing program 3142.

It is supposed that a work program 443a, a work program 443b, and the management agent program 441 are running on the host computer 40, and that these respective programs have identifiers like "PROG1", "PROG2" and "AG1". The work program 443a uses the logical volume 322a, and the work program 443b uses the logical volume 322b. Furthermore, the operational status of "PROG1" is "BACKUP", and the operational status of "PROG2" is "fault stop". Inside the storage device 30a, which has the identifier "ST1", there is the copy processing program 3142, the logical volume 322a, which has the identifier "VOL11", and the logical volume 322b, which has the identifier "VOL12". There is also a copy pair 93a, for which the logical volume 322a is the copy source, and logical volume 322c is the copy destination.

In the present application, hereinafter the pair in a copy process from one certain logical volume 322 to one other logical volume 322 will be called a copy pair 93. The identifier of copy pair 93a is "PAIR11", and the status is "split (normal)". Similarly, a copy pair 93b exists from logical volume 322b to logical volume 322d, the identifier thereof is "PAIR12", and the status is "split (failure)".

Inside the storage device 30b, which has the identifier "ST2", there is logical volume 322c, the identifier for which is "VOL21", a logical volume 322d, the identifier for which is "VOL22", a logical volume 322e, the identifier for which is "VOL23", and a logical volume 322f, the identifier for which is "VOL24". Then, there is a copy pair 93c from the logical volume 322c to the logical volume 322e, and a copy pair 93d from the logical volume 322d to the logical volume 322f, their respective identifiers being "PAIR21" and "PAIR22", and their statuses being "copying" and "pair", respectively.

Figure 3:
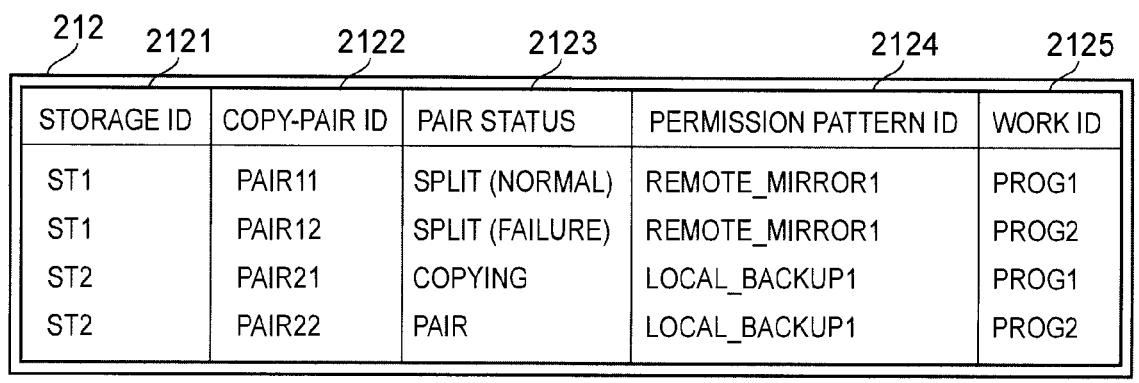
FIG. 3 is a diagram showing a data structure and examples of data of copy-pair information 212 of the first embodiment and the second embodiment.

FIG. 3 is a diagram showing the data structure of the copy-pair information 212, and specific examples of the contents reflecting the circumstances of FIG. 2.

The copy-pair information 212 is configured from a storage ID 2121 column that holds the identifier of the storage device 30, a copy-pair ID 2122 column that holds the identifier of the copy pair 93, a pair status 2123 column that denotes the status of the copy pair 93 specified by the copy-pair ID 2122, a permission pattern ID 2124 column, which is the operation permission pattern identifier for this copy pair 93, and a work ID 2125 column for specifying the work program 443 related to this copy pair 93.

Furthermore, the identifier of the storage device 30 that constitutes the issuing destination of the operating command issued from the management server program 211 for controlling the relevant copy pair 93 is registered in the storage ID 2121, that is, the identifier of the storage device 30 in which the copy-source logical volume 322 is stored is shown. For example, the copy-source of the copy pair in the storage ID 2121 of the copy pair 93a in FIG. 2 is logical volume 322a, and since this logical volume is included in the storage device 30a, the storage ID 2121 uses "ST1", which is the identifier of this storage device. Further, the copy-pair information 212 is an amount of information proportional to the number of copy pairs 93 that exist. In the example of FIG. 2, since four copy pairs 93, which have the identifiers "PAIR11", "PAIR12", "PAIR21", "PAIR22", exist, in FIG. 3, the information corresponding to the copy pairs 93 is registered in a total of four rows in a format that assigns one copy pair 93 to one row.

The pair status 2123 column holds the copy status of a pair specified in the copy-pair ID 2122 column. In the example of FIG. 3, "split (normal)" denotes a state in which copy processing has been discontinued in accordance with an administrator 91 operation. The status "split (failure)" denotes a state in which copy processing has been discontinued by the failure of the copy pair 93, "copying" denotes that copy processing is in progress, and "pair" denotes a state in which copy processing was completed and the contents of the copy-source logical volume 322 and the copy-destination logical volume 322 are identical. Further, in the permission pattern ID 2124 column of FIG. 2, "REMOTE_MIRROR1" is registered for "PAIR11" and "PAIR12", and "LOCAL_BACKUP1" is registered for "PAIR21" and "PAIR22". This content may be specified individually by the administrator, or a predetermined value may be used in accordance with whether it is a copy pair between two different storage devices 30, or a copy pair inside the same storage device 30.

FIG. 4 is a diagram showing the data structure of the operation propriety information 213 and specific examples of contents reflecting the circumstances of FIG. 2. The operation propriety information 213 is configured from a permission pattern ID 2131 column, a work status 2132 column, a role 2133 column, and a pair operation propriety 2134 column.

The permission pattern ID 2131 is information that constitutes the primary key for the pair operation propriety 2134 for a specified copy pair, and defines a copy pair 93 separately by application. For example, in the case of a copy pair 93 between different storage devices 30, there are instances in which the permission pattern ID 2131 uses the same inter-storage device 30 copy pair 93 for a data backup. The contents specified by the permission pattern ID 2124 in the copy-pair information 212 is referenced in a form corresponding to the permission pattern ID 2131 of the operation propriety information 213. For example, in FIG. 3, since the content of the permission pattern ID 2124 of PAIR11 is "REMOTE_MIRROR1", a permission pattern ID 2131 constituting "REMOTE_MIRROR1" is used from among the information within the operation propriety information 213 as the operation propriety related to PAIR11.

The status types of the work program 443 are included in the work status 2132 column. In addition, the role of the administrator 91 is registered in the role 2133 column. In this embodiment, two types of roles, i.e. a storage administrator and a work administrator, are assumed, and "storage" in the role 2133 column of FIG. 4, denotes the former, and "work" denotes the latter. As for the information inside the operation propriety information 213, the permission pattern ID 2131, the work status 2132 and the role 2133 are key information for specifying a single pair operation propriety 2134. The pair operation propriety information 2134 shows the operation propriety by type of operation. "NO" denotes that an operation is not permitted, and "YES" denotes that an operation is permitted, respectively.

Furthermore, the format of the contents of the pair operation propriety 2134 does not matter as long as it is possible to determine if the specified type of operation is permitted or not. For example, a format that only lists operations that are possible may be used.

FIG. 5 is a diagram showing the data structure of the administrator role information 214, and specific examples of the contents reflecting the circumstances of FIG. 2. The administrator role information 214 is configured by a user name 2141 column, a resource type 2142 column, and a resource ID 2143 column.

The user name 2141 is an identifier for specifying an arbitrary administrator 91. The resource type 2142 is information denoting the type of the target for which the relevant administrator has been granted permission. In this embodiment, the two types of "storage" and "work" are assumed, but besides these "copy pair" or the like may also be added.

The resource ID 2143 is identifier information of the target for which the relevant administrator has been granted permission. The example of FIG. 5 shows that the administrator "USER_STO1" has permission for "storage (storage device 30)" having the identifiers "ST1" and "ST2". Similarly, "USER_PRO1" has permission for "work (work program 443)" having the identifier "PROG1".

FIG. 6 is a diagram showing the data structure of the work information 215, and specific examples of the contents reflecting the circumstances of FIG. 2. The work information 215 is configured from a work ID 2151 column and an agent ID 2152 column. The work program 443 identifier is placed in the work ID 2151 column.

By contrast, the identifier of the management agent program 441, which collects information related to the work program 443, is placed in the agent ID 2152 column. For example, in a case where the information of the work program 443a is acquired by the management agent program 441 in the configuration of FIG. 2, a pair made up of the work program 443a identifier "PROG1" and the management agent program 441 identifier "AG1" is entered into the work information 215.

FIG. 7 is a diagram showing the data structure of the work configuration information 442, and specific examples of the contents reflecting the circumstances of FIG. 2. The work configuration information 442 is configured from a work ID 4421 column and a volume 4422 column.

The work program 443 identifier is entered in the work ID 4421 column. The identifier of the logical volume 322 used by the work program 443 is entered into the volume 4422 column. In the example of FIG. 2, it is assumed that work program 443a is using logical volume 322a, and in accordance with this, "PROG1", which is the identifier of the former, is entered into the work ID 4421 column, and "VOL11", which is the identifier of the latter, is entered into the volume 4422 column.

Figure 8:
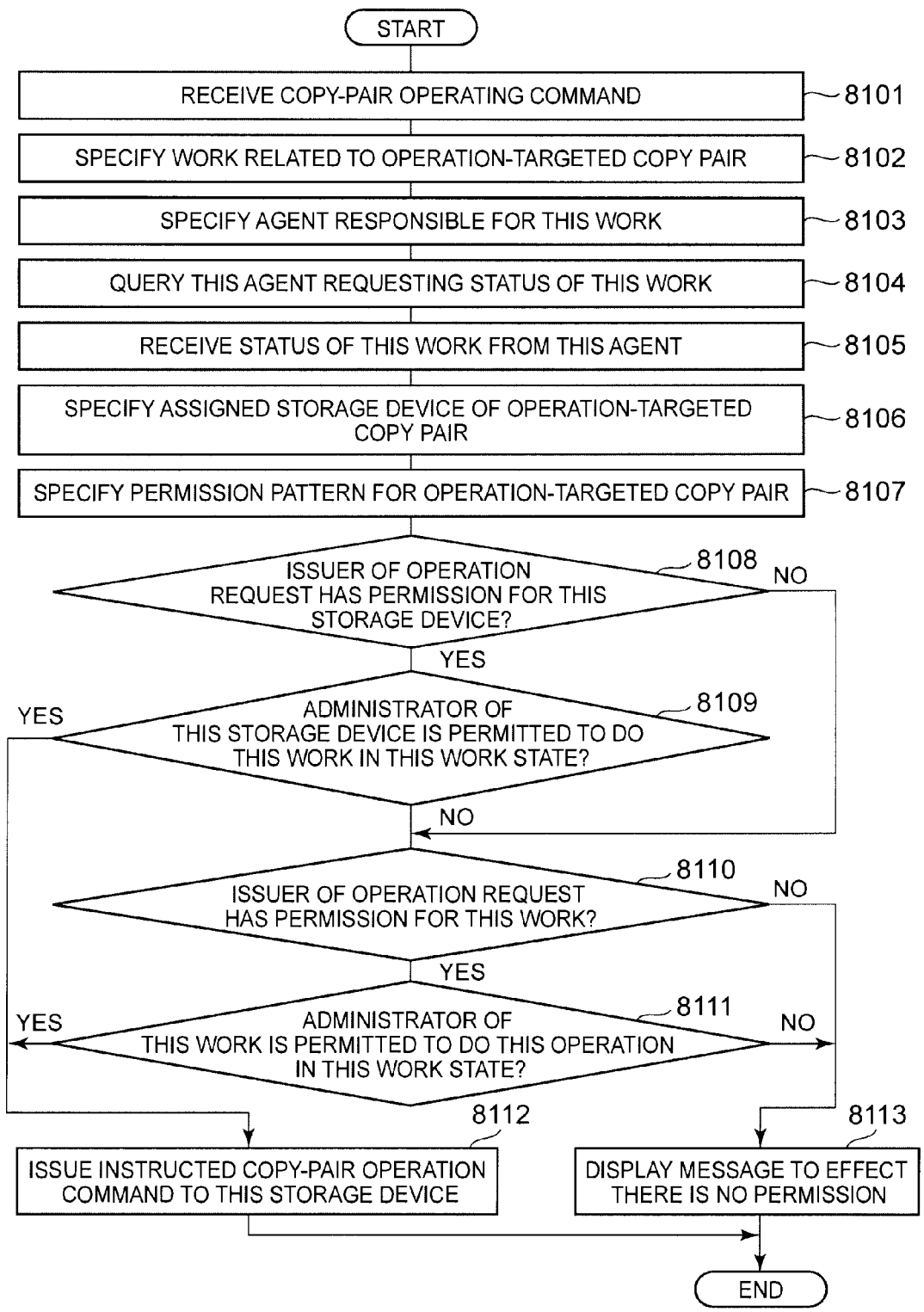
FIG. 8 is the flow of processing when an operating command 922 is received by a management server program 211 of the first embodiment.

FIG. 8 shows the flow of processing of the management server program 211 when an operating command 922 is received from the administrator 91 by way of the management terminal 10. The first step (8101) is to receive a copy-pair operating command. Typically, this process is such that the management server program 211 is constantly in a state of waiting to receive an operating command 922 from the management terminal 10, and upon receiving the operating command 922, executes the processing of 8102 and thereafter of FIG. 8.

The second step (8102) is to specify the work program 443 that relates to the operation-targeted copy pair. Specifically, the identifier of the operation-targeted copy pair 93 included in the operating command 922 is retrieved from the copy-pair ID 2122 column of the copy-pair information 212. In the example of FIG. 2, the copy-pair 93 identifier included in the operating command 922 (operating command 921) is "PAIR12", and this identifier is found in the second row of the copy-pair information 212 of FIG. 3. The identifier "PROG2" of the work ID 2125 column of the second row is the information for specifying the work program 443.

The third step (8103) is to specify the management agent program in charge of the specified work program 443. This process can be carried out by searching the work information 215 for the identifier of the work program 443 specified in the previous step. In the example of FIG. 6, searching the contents of the work ID 2151 column for the row in which the "PROG2" specified in the previous step is entered reveals that this is the second row. The content "AG1" of the agent ID 2152 column of this second row is the identifier of the work agent program 441.

The fourth step (8104) is to query the management agent program 441 specified in the third step as to the status of the work program 443 specified in the second step (8102). In FIG. 2, this process corresponds to arrow 923, and takes the form of querying the management agent program 441 (identifier="AG1") as to the status of the work program 443b (identifier="PROG2").

The fifth step (8105) is to receive the status of the work program 443 from the management agent program 441. In FIG. 2, this process corresponds to arrow 924, and the received information is "fault stop", which is the status of the work program 443b. The sixth step (8106) is to specify the assigned storage device 30 of the operation-targeted copy pair 93. This assigned storage device 30 may be specified by referencing the copy-pair information 212. In the example of FIG. 2, the operation-targeted copy pair 93 is "PAIR12", and this identifier is in the second row of the copy-pair ID 2122 column of the copy-pair information 212. The content of this second row of the storage ID 2121 column is the identifier of the storage device 30 to which the relevant copy pair 93 is assigned, that is "ST1".

The seventh step (8107) is to specify the permission pattern for the operation-targeted copy pair 93. This process may also specify the permission pattern by referencing the copy-pair information 212. In the previous step, it was determined that the second row is information related to this operation-targeted pair. "REMOTE_MIRROR1", which is the content of this second row of the permission pattern ID 2124 column is the identifier of the permission pattern.

The eighth step (8108) is to determine whether or not the administrator 91, who is the issuer of the operation request, has permission with respect to the relevant storage device 30. In this process, the determination may be made by referencing the contents of the administrator role information 214.

In the example of FIG. 2, the identifier of this administrator 91 is given as "USER_STO1", and since the identifier of the storage device 30 specified in the sixth step (8106) is "ST1", a search is done in the administrator role table 214 for the row in which the content of the user name 2141 column is "USER_STO1", the content of the resource type 2142 column is the type name "storage" corresponding to the storage device 30, and the content of the resource ID 2143 column is "ST1".

In a case where the corresponding information was found as a result of this search, a determination is made that this administrator 91 has permission, and in a case where this information was not found, a determination is made that this administrator 91 does not have permission. In the example of FIG. 5, this information exists in the first row, so that this administrator 91 is regarded as having permission.

The ninth step (8109) is a process for a case in which the determination made in the eighth step (8108) was that this administrator 91 has permission. Specifically, a determination is made as to whether or not the operation included in the operating command 922 received in the first step (8101) is permitted under the status of the work program 443b received in the fifth step (8105).

This process may be carried out by referencing the operation propriety information 213. That is, a search is done for the row in which the content of the permission pattern ID 2131 column constitutes the permission pattern identifier "REMOTE_MIRROR1" specified in the seventh step (8107), the content of the work status 2132 column matches the "fault stop" status of the work program 443b received in the fifth step (8105), and the content of the role 2133 column is "storage", which denotes the storage device 30.

In the example of FIG. 4, the seventh row from the top corresponds to these conditions. In addition, the operation type received in the first step (8101) specifies the type of operation based on the status of the copy pair 93. In this example, the content of the operating command 921 (922) is "resynchronize" for "PAIR12", and it is clear from the copy-pair information 212 that the status of "PAIR12" is "split (failure)". This operation is a "resynchronize" for the "split (failure)" state, and corresponds to resynchronize (failure) 21343, which is an item in the pair operation propriety 2134 column of the operation propriety information 212.

In the example of FIG. 4, since the content of this item was "NO", a determination will be made that the requested operation is not permitted. Furthermore, in the example of FIG. 4, only in the case of "resynchronize" is the status of the copy pair 93 included and the operation type subdivided; the copy pair 93 status is not included for operations other than "resynchronize", such as "initial copy" 21341. The application or non-application of subdividing to these other operations may be selected in accordance with system conditions.

The tenth step (8110) is a process for a case in which the determination in the eighth step (8108) was that this administrator 91 does not have permission, and the determination in the ninth step (8109) was that the operation is not permitted. Specifically, a determination is made as to whether or not the administrator 91, who is the operation request issuer, has permission with respect to the relevant work program 443. In this process, a determination may be made by referencing the content of the administrator role information 214.

Since the identifier for this administrator 91 is given as "USER_STO1" in the example of FIG. 2 and the identifier of the work program 443 specified in the second step (8102) is "PROG1", a search of the administrator role table 214 is done for the row in which the content of the user name 2141 column is "USER_STO1", the content of the resource type 2142 column is the type name "work" corresponding to the storage device 30, and the content of the resource ID 2143 column is "PROG1". In a case where the corresponding information was found as a result of this search, a determination is made that this administrator 91 has permission, and in a case where this information was not found, a determination is made that this administrator 91 does not have permission. In the example of FIG. 5, this kind of information does not exist, so that this administrator 91 is regarded as not having permission.

The eleventh step (8111) is a process that is executed when the determination in the tenth step (8110) is that this administrator 91 has permission, and the content thereof is substantially the same as the ninth step (8109). The only difference is the search-target keyword in the role 2133 column of the operation propriety information 213. In the ninth step (8109), "storage" is the search target, but in the eleventh step (8111), "work" becomes the search target.

The twelfth step (8112) is to issue to the copy processing program 3142 inside the storage device 30 an operating command that has the copy pair 93 as the target. At this time, the operating command issue-destination storage device 30 is determined by referencing the copy-pair information 212. Since the operation-targeted copy pair 93 is "PAIR12" in the example of FIG. 2, referencing FIG. 3 reveals that the storage device 30 having the identifier "ST1" is the issue destination.

The thirteenth step (8113) is a process for a case in which the determination made in the tenth step (8110) was that this administrator 91 does not have permission, and the determination made in the eleventh step (8111) was that the operation is not permitted. Specifically, a message to the effect that this administrator 91 does not have permission is displayed on the display device 13 of the management terminal 10 (8113), and, for example, the management server program 211 may notify the console program 111 to this effect when returning the results of the operating command 922, and have the console program 111 display this notification on the screen.

Figures 9, 10:
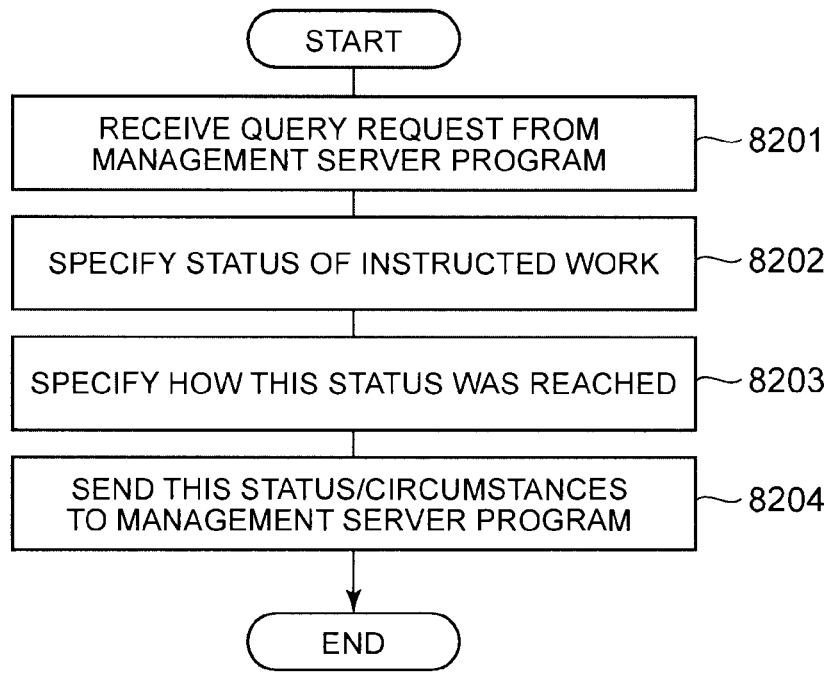
FIG. 9 is the flow of processing when a work status query request 925 is received by a management agent program 441 of the first embodiment.
FIG. 10 is a diagram showing a data structure and examples of data of work information 215 of the second embodiment.

FIG. 9 is the flow of processing of the management agent program 441 when a query related to the status of the work program 443 has been received from the management server program 211.

The first step (8201) is to receive the query request 923 related to the status of the work program 443 from the management server program 211. The management agent program 441 is a resident program, and may constantly be kept in a state of waiting for a query request 923 from the management server program 211.

The second step (8202) is to fetch the identifier included in the query request 923, and check the status of the work program 443 specified by this identifier. In this embodiment, it is assumed that the identifier of the work program 443 to be queried is included in the query request 923, but a system in which the management agent program 441 checks the status of all the status-confirmable work programs 443 without including this identifier in the query request 923 may also be adopted.

The types of statuses of the work program 443 will differ in accordance with the type of work program 443, and, for example, may conceivably include "normal operation", "batch", "BACKUP", "fault stop", "normal-suspend", "test" and "unused".

"Normal operation" here denotes a state in which the work program 443 is performing the principal processing of the work program 443 in question, such as online processing. "Batch" denotes a state in which the work program 443 is performing batch processing, such as data tabulations. "BACKUP" denotes a case in which a backup of the relevant work data is in progress. "Failure-suspend" denotes a case in which the work program 443 is suspended, and that the suspension was carried out in accordance with a failure, and "normal-suspend" denotes a case in which the administrator performed an operation to suspend the work program 443. Further, "test" denotes that the relevant work program 443 is running a test, and "unused" denotes a state in which a logical volume 322 that constitutes the copy source of an operation-targeted copy pair 93 is not being used by the relevant work program 443.

A decision as to whether or not the work program 443 is running, for example, may be specified by referencing the contents of the process/service list being executed on the OS (Operating System) 444. Whether or not the work program 443 is engaged in normal processing may be confirmed by setting either the process name or the service name that performs normal processing beforehand, and checking the operational status of the above-mentioned process name or service name program by referencing the above-mentioned process/service list. Determining whether or not the work program 443 is in the midst of batch processing is the same as confirming normal processing. Also, a decision as to whether or not the work program 443 is in the midst of a data backup is specified by means for referencing an attribute value when the work program 443 itself possesses this attribute value denoting whether or not it is a backup state. A decision as to whether or not the status is test may be specified by using means for providing the work program 443 with attribute information denoting that it is the test state, the user arbitrarily setting the above-mentioned attribute information, and the management agent program 441 reading this attribute information. Whether or not it is the unused state may be confirmed by referencing the configuration information of the work program 443 and checking the utilization status of the logical volume 322.

The third step (8203) is a process for specifying the circumstances via which the work program 443 came to be in its current state. When the determination in the second step (8202) was that the work program 443 is suspended, the reason for the suspension will be ascertained.

This process is implemented in a case where it is desirable to change the way operation permission is granted in accordance with whether the work program 443 was suspended normally, or was suspended due to the occurrence of a failure of some sort. If the work program 443 and OS 444 are provided with a mode for outputting to an event log (a file that records events) information to the effect that the work program 443 booted up, ended normally or generated an abnormality, a determination as to normal or failure may be made by referencing the contents of this event log.

For example, in a case where the work program 443 is suspended, "normal-suspend" may be determined when the latest entry in the event log denotes a normal end, and "fault stop" may be determined when the latest event log entry is not normal end.

The fourth step (8204) is to send either the status or the status including the circumstances to the management server program 211. This step corresponds to the query result 924 in FIG. 2.

Furthermore, in this embodiment, the operating commands 921 were classified on the basis of the role of the administrator 91, but permission may also be granted to administrators individually. The following change may be applied in this case. Instead of a role 2133 column, the operation propriety information 213 will be provided with an identifier for specifying the administrator, that is, information corresponding to the user name 2141 of the administrator role information 214. The administrator role information 214 will become unnecessary. Consequently, the processing from the eighth step (8108) through the eleventh step (8111) of the processing flow shown in FIG. 8 may be consolidated into a single step for determining the operation propriety based on the information specified up until the seventh step (8107) and the above-mentioned altered administrator role information 214.

Further, the operating command 921 may also be classified by the group to which the administrator 91 belongs. That is, instead of the role 2133 column of the operation propriety information 213, the name of the group to which the administrator belongs is defined. Then, the resource type 2142 and resource ID 2143 in the administrator role information 214 are replaced with the group name. The same change as that in the case of the above-mentioned granting of permission to administrators individually may also be added to the processing flow shown in FIG. 8.

In the first embodiment described above, the two types of "storage" and "work" were used as the resource types of the administrator role information 214, but "host" may also be used. "Host" refers to the host computer 40 on which the work program 443 runs, and the host computer 40 identifier is stored in the resource ID 2143 column. Further, in a case where a plurality of host computers 40 exists, and there is a separate host computer 40 that serves as a relay between the storage device 30 and the host compute 40 that is running the work program 443, the identifier of this relay host computer 40 may also be stored in the resource ID 2143 column.

In the first embodiment, the operation propriety information 213 is used as information, but this operation propriety information 213 may also be implemented as program processing logic.

[Embodiment 2]

The storage device 30 operation restrictions intended by the present invention may be carried out by the management server program 211 and the management agent program 441 executing the processing flows of FIGS. 8 and 9 described hereinabove, but the delivery of the work program 443 status is not limited to the first embodiment method. The second embodiment is an example of this, and the points of difference with the first embodiment will be explained hereinbelow. In the second embodiment, a portion of the data structures and the flow of processing differ. The data structure that differs is that of the work information 215. FIG. 10 shows the work information 215 for the second embodiment. This difference takes the form of adding a work status 2153 column to that for the first embodiment shown in FIG. 6. The work status 2153 column stores the status of the work program 443 received from the management agent program 441.

Figure 11:
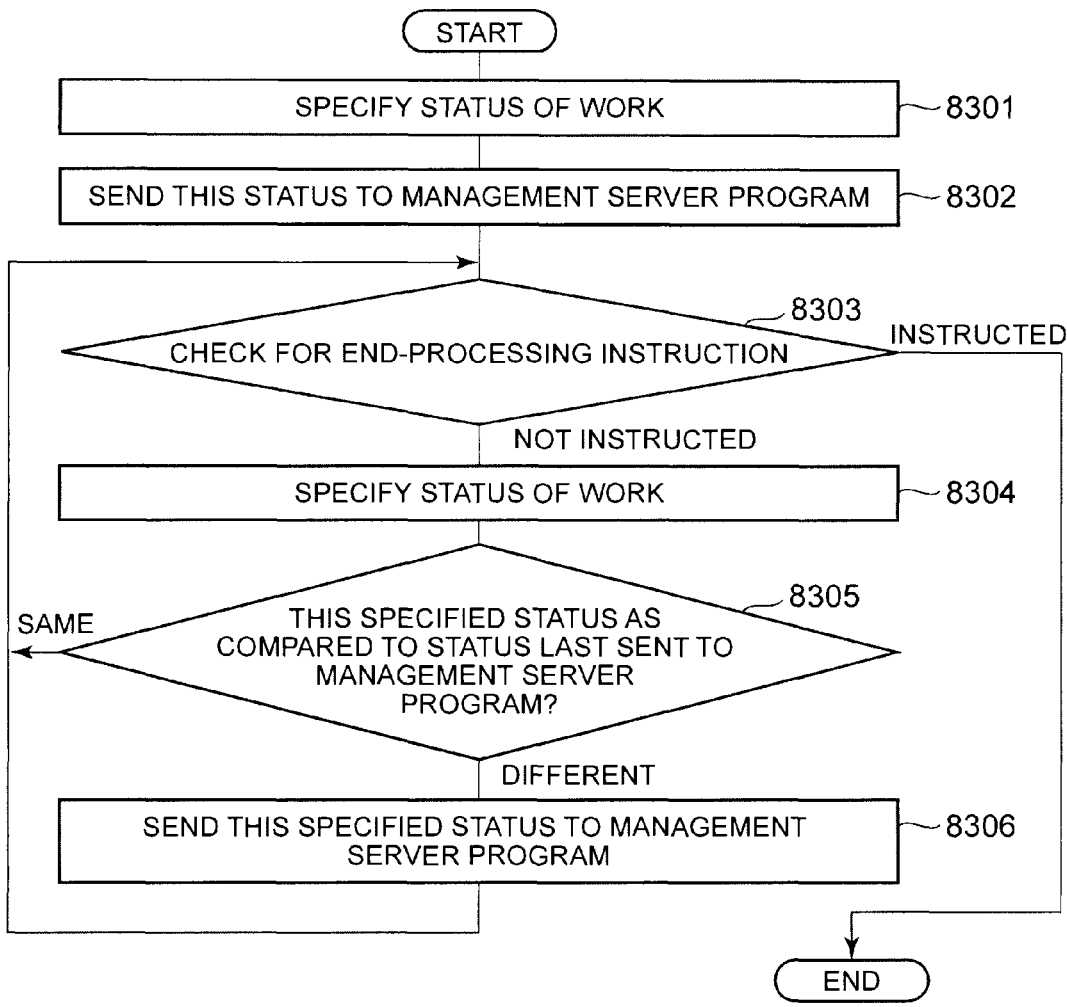
FIG. 11 is the flow of processing for communicating the status of the work program 443 from the management agent program 441 of the second embodiment to the management server program 211.

The flow of processing for the second embodiment is broadly divided into two systems. The first system is divided into the management agent program 441 part and the management server program 211 part. The management agent program 441 part of the first system is as shown in FIG. 11.

The first step (8301) is to specify the status of the work program 443, but the details thereof are the same as the first step (8101) of FIG. 8 described in the section on the first embodiment. Further, the second step (8302) is the same as the fourth step (8104) of FIG. 8. In FIG. 11, the third step (8103) of FIG. 8 is omitted, but it may also be included. The third step (8303) of FIG. 11 is an end-determination with respect to the management agent program 441.

In the second embodiment, since the management agent program 441 continuously monitors changes in the status of the work program 443, some sort of program ending means is required. The third step (8303) provides such means, and the management agent program 441 ends when an instruction of one kind or another is received from the user.

The fourth step (8304) if for specifying the status of the work program 443, and as such is the same as the first step (8301).

The fifth step (8305) is for determining whether or not the status of the work program 443 has changed, and is performed by comparing the status of the work program 443 notified to the management server program 211 at the end of either the second step or the sixth step against the current status of the work program 443, and if these statuses are the same, a determination is made that there has been no change in the status and processing returns to the third step, but if the statuses differ, a determination is made that the status has changed.

The sixth step (8306) is processing for when the determination in the fifth step (8305) is "different", and sends the current status of the work program 443 specified in the fourth step (8304) to the management server program 211.

Figure 12:
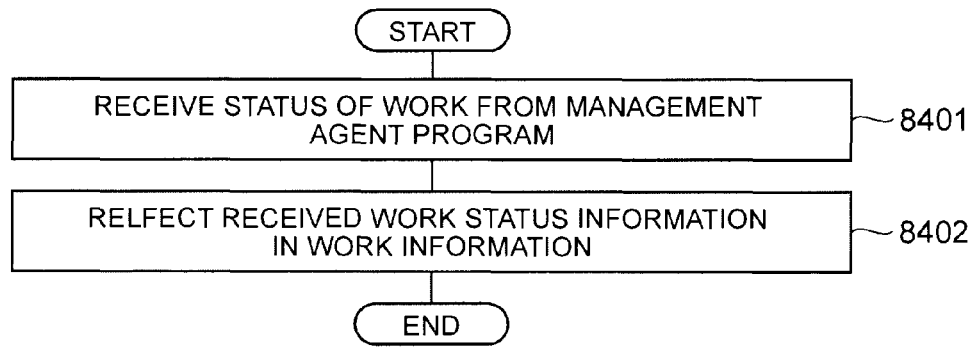
FIG. 12 is the flow of processing when the management server program 211 of the second embodiment receives the work program 443 status.

The management server program 211 part of the first system processing flow is shown in FIG. 12. The first step (8401) is a process for receiving the status of the work program 443 sent in either the second step (8302) or the sixth step (8306) of the flow of processing shown in FIG. 11.

Figure 13:
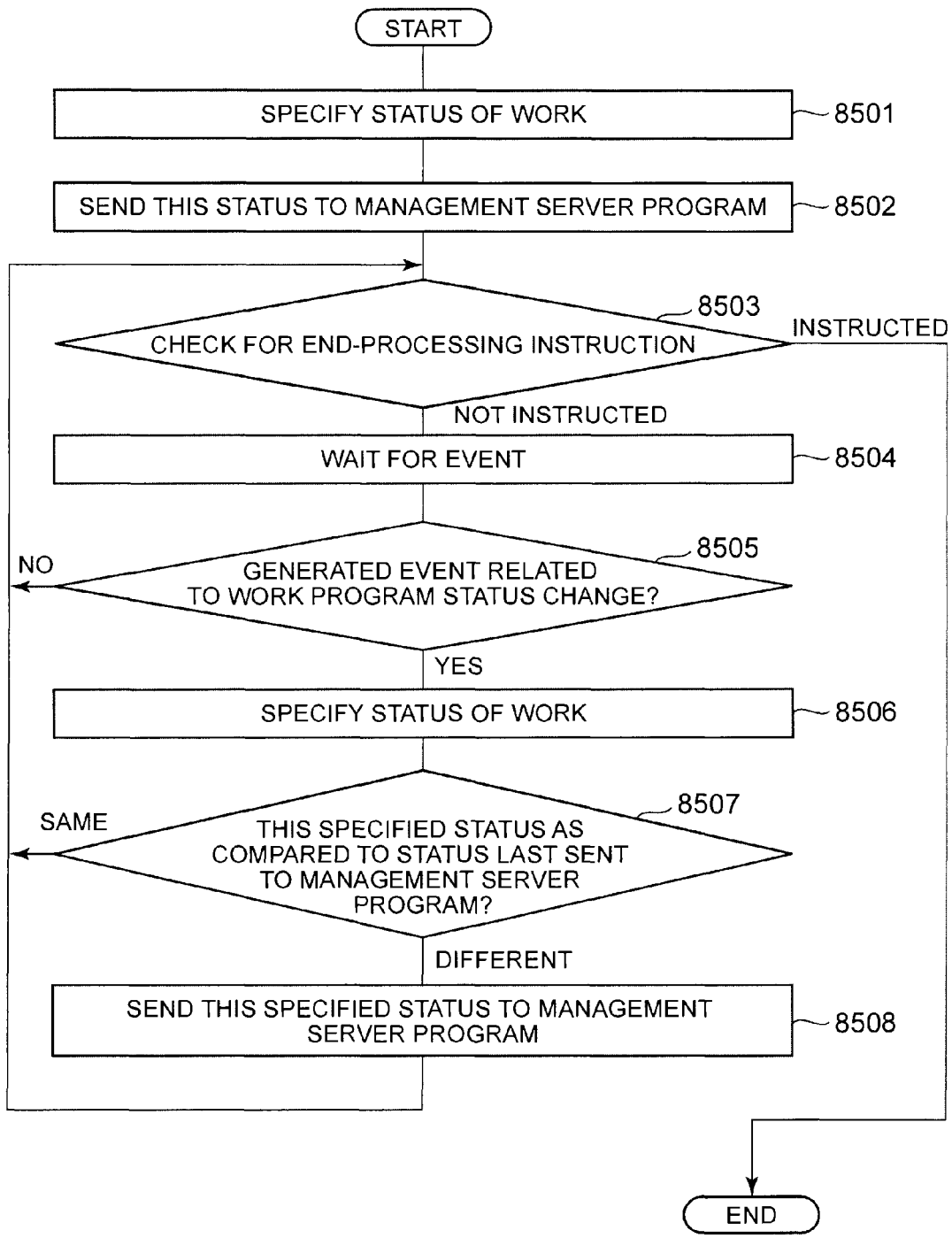
FIG. 13 is the flow of processing for communicating the work program 443 from the management agent program 441 of the second embodiment to the management server program 211.

The processing of the second step (8402) is for storing the work program 443 status received in the first step (8401) in the work information 215. A different mode for the first system processing flow (FIG. 11) of the management agent program 441 may also take the form of waiting for the occurrence of a status changing event. FIG. 13 shows this processing flow.

The first step (8501) through the third step (8503) are the same as the first step (8301) through the third step (8303) of FIG. 11.

The fourth step (8504) is a process for waiting for the occurrence of an event. The event here is the same as the event described in the explanation of FIG. 9. The management server program 211 continuously waits for the occurrence of an event, and when an even occurs, proceeds to the fifth step (8505).

The fifth step (8505) is a process for checking what kind of event occurred, and determining whether or not the event relates to a change in the status of the relevant work program 443. In the case of an event that relates to the relevant work program 443, if this event denotes a program boot, suspension or the occurrence of a failure, the determination is that the event relates to a change in status ("YES" in FIG. 13), and if it is not such an event, the determination is that the event is not related to a change in status ("NO" in FIG. 13).

The processing of the sixth step (8506) through the eighth step (8508) is the same as that of the fourth step (8304) through the sixth step (8306) of FIG. 11.

Figure 14:
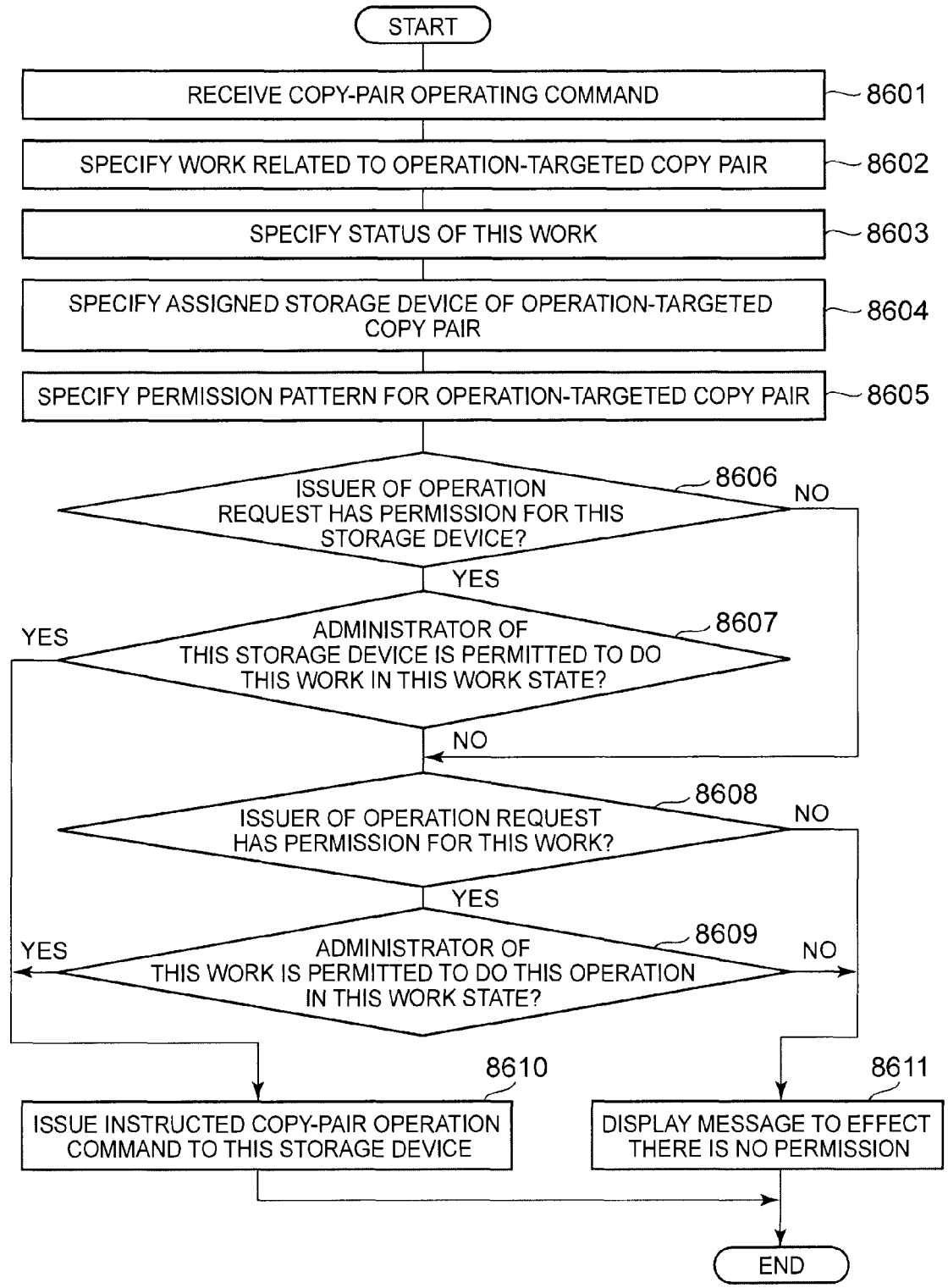
FIG. 14 is the flow of processing when an operating command 922 is received by the management server program 211 of the second embodiment.

The second system is oriented toward the management server program 211, and this processing flow is shown in FIG. 14. The first step (8601) and the second step (8602), respectively, are the same as the first step (8101) and the second step (8102) of FIG. 8.

The third step (8603) is a process for specifying the status of the work program 443, and differs in that the processing flow of FIG. 14 is implemented by referencing the work information 215 of FIG. 10 instead of querying the management agent program 441 as in FIG. 8.

The processing of the fourth step (8604) through the eleventh step (8611) is the same as that of the sixth step (8106) through the thirteenth step (8113) of FIG. 8.

Furthermore, permission information may also be changed in accordance with the operational status of the work program 443. For example, the pair operation propriety 2134 column and the role 2133 column included in the operation propriety information 213 may also be added to the copy-pair information 212.

In accordance with this, there will be two rows of information per role 2133 for each copy pair 93. Then, the management server program 211, upon acquiring the operational status of the work program 443 from the management agent program 441, sets (overwrites) the contents of the pair operation propriety 2134 and the role 2133 of the row in which the permission pattern and work status in the operation propriety information 213 match with respect to the row in which the content of the work ID 2125 column in the copy-pair information 212 matches the identifier of this work program 443. Then, when a copy-pair operating command 922 is received from the administrator, the management server program 211 references the content of the operation propriety 2134 column included in the copy-pair information 212 and determines the operation propriety.

The operational status of the work program 443 may also be regularly acquired from the management server program 211 without detecting a change in the operational status of the work program 443 on the management agent program 441 side. In accordance with this, the processing of the management agent program 441 side becomes the same as in the first embodiment.

[Embodiment 3]

The processing mode disclosed in the present invention is not limited to access restriction related to a copy operation. For example, the present invention is also applicable to operation control for a logical volume 322. The third embodiment is one example of this, and the points of difference with the first embodiment will be explained below.

Figure 15:
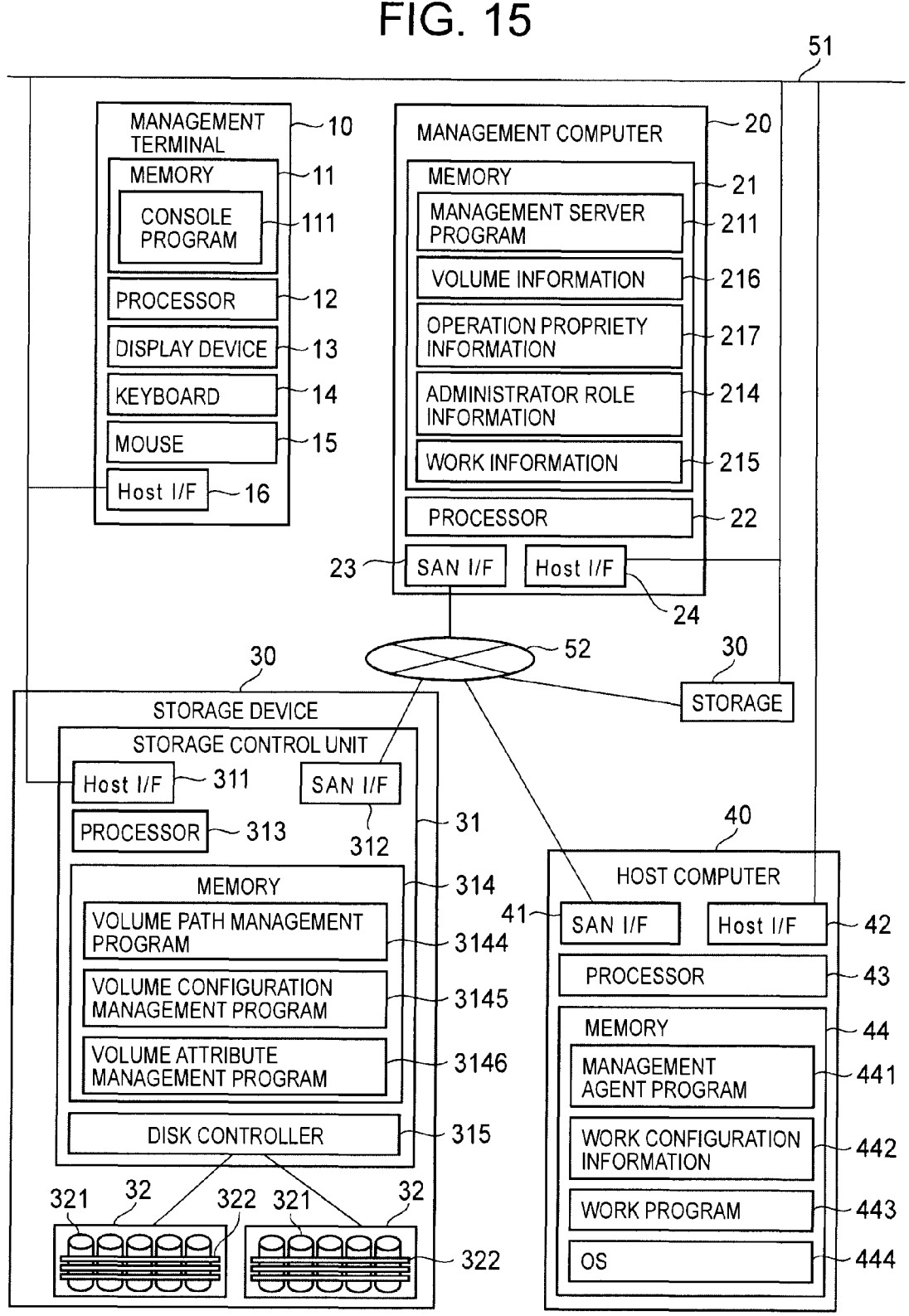
FIG. 15 is a system block diagram of a third embodiment.

FIG. 15 is a diagram showing an example of the system configuration in a case where a mode of the present invention is applied to controlling access with respect to a volume setting change. The points of difference with FIG. 1 are that volume information 216 is held inside the management computer 20, and that a volume path management program 3144, a volume configuration management program 3145, and a volume attribute management program 3146 are held inside the storage device 30.

The volume path management program 3144 is for managing a path setting from the host computer 40 to the logical volume 322, and possesses functions for applying access restrictions that enable a specified logical volume 322 to be used only by a specified host computer 40, and for changing a path setting.

The volume configuration management program 3145 provides logical volume 322 configuration management functions. For example, this program 3145 provides a function for creating and deleting a logical volume 322; a function for portraying a plurality of logical volumes 322 as a single logical volume 322 and accessing this single logical volume 322 from the host computer 40; a function for accessing from the host computer 40 a logical volume 322 that exists in another storage device 30 as if it were a logical volume 322 inside the host computer's 40 own storage device 30; and a function for migrating an area in which the data of the logical volume 322 is stored to another storage area. The volume attribute management program 3146 manages the attributes, for example, reading/writing permitted, of the logical volume 322.

Figure 16:
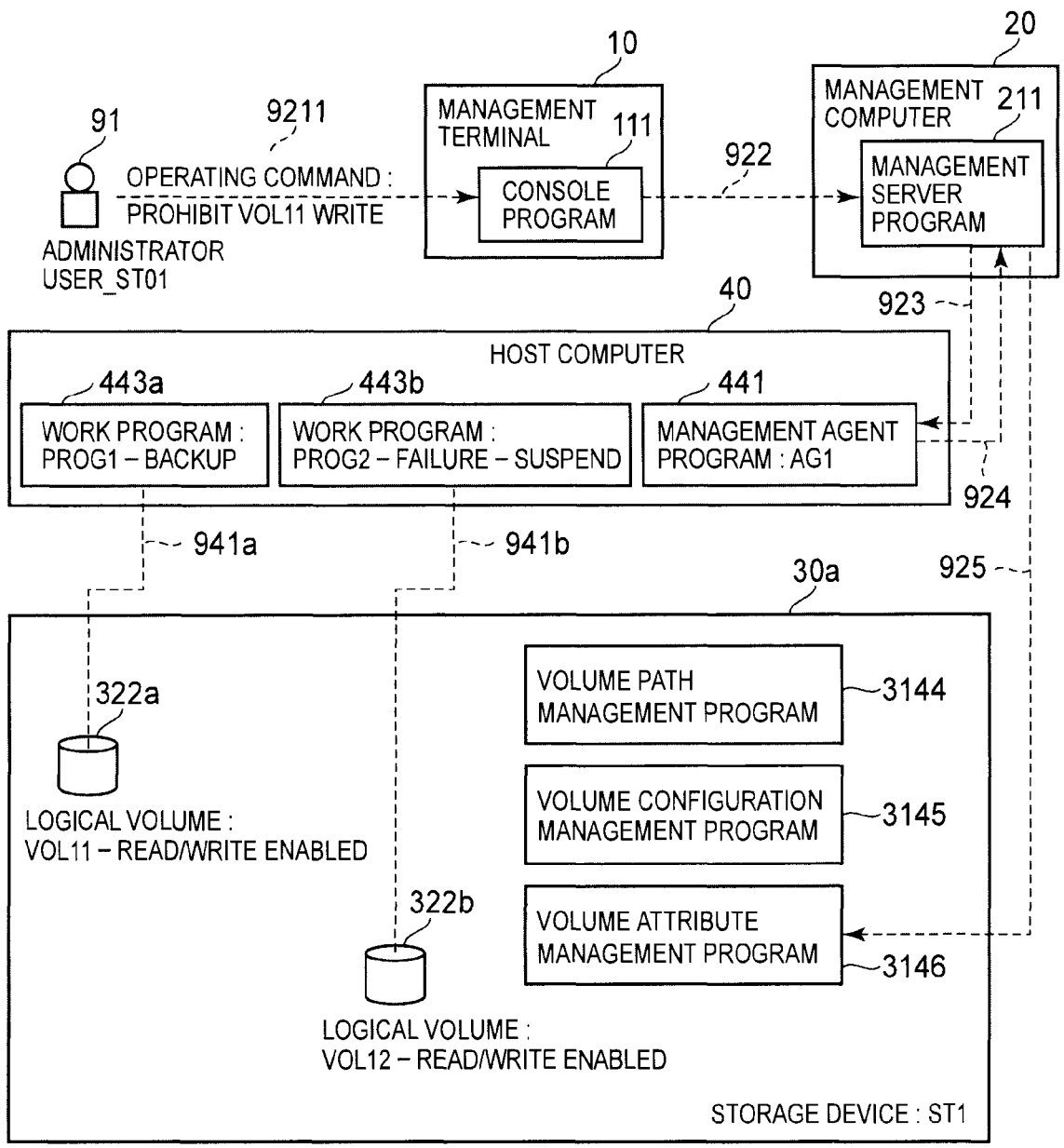
FIG. 16 is a diagram showing the relationship between the system components of the third embodiment and the status of these components.

FIG. 16 is a model diagram for explaining the third embodiment. The existence of the volume path management program 3144, the volume configuration management program 3145 and the volume attribute management program 3146 inside the storage device 30a differs from FIG. 2.

FIG. 17 is a diagram showing the data structure and examples of the data of the volume information 216. A storage ID 2161 column maintains the identifiers of storage devices 30 in which specified logical volumes 322 are arranged. A volume 2162 column maintains logical volume 322 identifiers. A permission pattern ID 2163 column maintains permission pattern identifiers of relevant logical volumes 322. A work ID 2164 column maintains the identifiers of work programs 443 that use the relevant logical volumes 322.

FIG. 18 is a diagram showing the data structure and examples of the data on operation propriety information 217. The data structure is the same as that of the operation propriety information 213 shown in FIG. 4, with the single exception of a volume operation propriety 2174 column being included instead of the pair operation propriety 2134 column.

An add path 21741 sub-column and an delete path 21742 sub-column included under the volume operation propriety 2174 column show the addition and deletion of path settings in accordance with the volume path management program 3144. An add configuration 21743, a delete configuration 21744 and a disassemble (delete) 21745, respectively, are operations for adding and deleting components inside the logical volume 322, and deleting the logical volume 322 itself, in accordance with the volume configuration management program 3145. A change attribute 21746 is an operation for changing the attribute of the logical volume 322.

Furthermore, this embodiment lumps together the various types of attribute changes, but these types of attribute changes may also be defined by subdividing operation propriety into volume read/write-enabled, read-only-enabled and so forth. Other items inside the volume operation propriety 2174, such as add path 21741, may also be subdivided in the same way.

FIG. 19 is the flow of processing when the management server program 211 has received an operating command 922 in FIG. 2. The difference with FIG. 8 is that the processing target of the first step (81011), the second step (81021), the sixth step (81061), the seventh step (81071) and the twelfth step (81121) is "volume" instead of "copy pair".

An example of the operation of the third embodiment will be explained below using FIG. 16. In FIG. 16, the administrator 91 issues an operating command 9211 to the effect "prohibit VOL11 write". The management server program 211 receives this operating command 9211 by way of the console program 111, references the volume information 216, and specifies the work program 443a "PROG1" that is using logical volume 322a "VOL11", which is the target of the operation.

In addition, the management server program 211 also specifies the management agent program 441 "AG1" responsible for this work program 443a by referencing the work information 215, and acquires the work program 443a status "normal operation" from this program. By referencing the volume information 216, the management server program 211 also specifies the permission pattern "DATABASE_TYPE1" corresponding to the logical volume 322a. Next, by referencing the administrator role information 214, the management server program 211 specifies that administrator 91 "USER_STO1" is the "storage administrator" of the storage device 30a and not the "work administrator".

On the basis of the above-mentioned information, the management server program 211 references the volume operation propriety information 2174, and is thereby able to determine that the operating command 9211 "prohibit write" that corresponds to change attribute 21746 is not permitted.

What is claimed is:

1. A management computer, which targets a storage device for an operation, and which is connected to the storage device and to a host computer,
the management computer comprising:
a memory; and
a control unit, wherein
the memory has information denoting a status of an application running on the host computer, and operation propriety information which comprises information denoting propriety of an operating command for the storage device in accordance with the application status-denoting information, and
the control unit receives the operating command, queries the status of the application that has sent the operating command from the host computer, and determines the propriety of the operating command by referencing the operating command, the results of the query and the operation propriety information.

2. The management computer according to claim 1, wherein the operation propriety information further comprises information for identifying a sender that sends the operating command.

3. The management computer according to claim 2, wherein the memory further has work information including an identifier for identifying the application, and information for denoting the status of the application, and
the control unit determines the propriety of the operating command by further referencing the work information instead of querying the status of the application that has sent the operating command from the host computer.

4. The management computer according to claim 3, wherein the control unit updates the work information in response to an occurrence of an event in the application.

5. The management computer according to claim 3, wherein the control unit updates the work information at predetermined times.

6. The management computer according to claim 4, wherein the information denoting the status of the storage device includes information as to whether or not the operation is being executed, information as to whether or not the operation has been suspended, and information as to whether or not the operation has been completed.

7. The management computer according to claim 6, wherein the information denoting the status of the application includes information as to whether or not the application is running.

8. The management computer according to claim 7, wherein, in a case where the application is not running, the information denoting the status of the application includes information as to a reason the application is not running.

9. The management computer according to claim 8, wherein the control unit executes the operation in a case where the determination of the propriety of the operating command is affirmative, and sends a notification to a sender who has sent the operating command to the effect that there is no permission for the operating command in a case where the determination of the propriety of the operating command is negative.

10. The management computer according to claim 9, wherein:
the operating command is a copy of a volume in the storage device;
the operation propriety information further has an identifier for identifying the operating command;
the memory further has information for specifying a storage device identifier and a pair of the copy, and status information including information for denoting the status of the copy pair and an identifier for identifying the operating command,
the control unit references the operating command and the status information, and specifies an area of the storage device to be the target of the operating command, and also determines the propriety of the operating command by referencing the status information.

11. The management computer according to claim 10, wherein, in a case where the operation has been suspended, the information denoting the status of the storage device further includes information as to a reason for this suspension.

12. The management computer according to claim 11, wherein the information for identifying the sender includes information as to whether or not the sender has permission to operate the storage device, and whether or not the sender has permission to operate the application.

13. The management computer according to claim 12, wherein the information for identifying the sender includes either information for uniquely specifying the sender, or information for uniquely specifying a group that classifies the sender.

* * * * *